No. 739,720. PATENTED SEPT. 22, 1903.
J. G. RIDER.
FOUNTAIN PEN.
APPLICATION FILED JUNE 22, 1901.
NO MODEL. 4 SHEETS—SHEET 1.
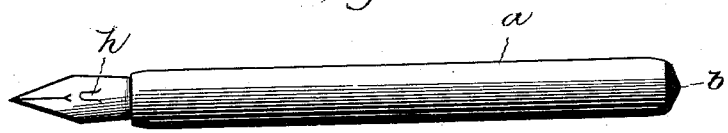
Fig. 1.
Fig. 2.
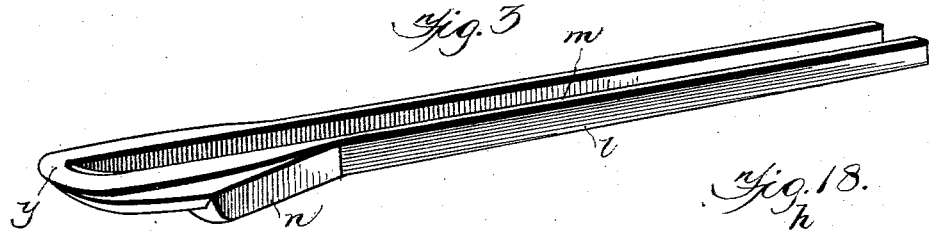
Fig. 3.
Fig. 18.
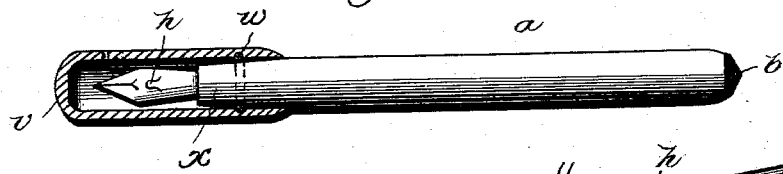
Fig. 4.
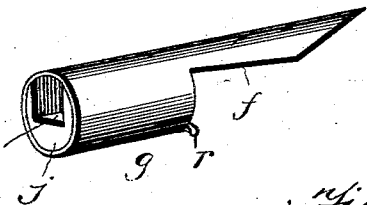
Fig. 5.
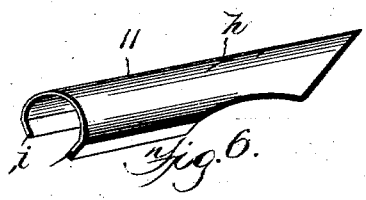
Fig. 6.
Fig. 15. Fig. 16. Fig. 7. Fig. 17.
  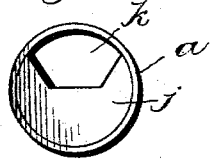
Witnesses Inventor
J. G. Rider.
by Wilkinson & Fisher
Attorneys No. 739,720. PATENTED SEPT. 22, 1903.
J. G. RIDER.
FOUNTAIN PEN.
APPLICATION FILED JUNE 22, 1901.
NO MODEL. 4 SHEETS—SHEET 2.

Witnesses
Inventor
J. G. Rider.
by Wilkinson & Fisher
Attorneys.

No. 739,720. PATENTED SEPT. 22, 1903.
J. G. RIDER.
FOUNTAIN PEN.
APPLICATION FILED JUNE 22, 1901.
NO MODEL. 4 SHEETS—SHEET 3.
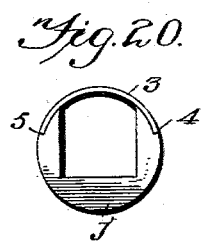
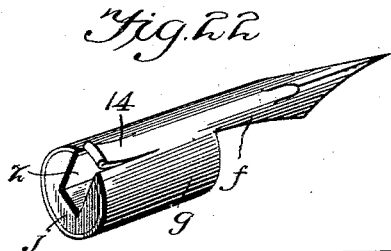
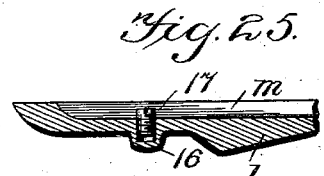
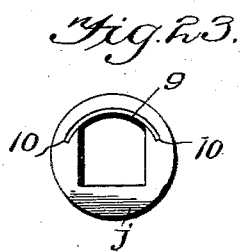
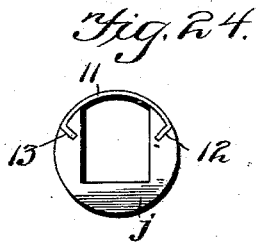
Witnesses
Geo. A. Byrne
Clarence Bateman
Inventor
J. G. Rider
by Wilkinson & Fisher
Attorneys No. 739,720. PATENTED SEPT. 22, 1903.
J. G. RIDER.
FOUNTAIN PEN.
APPLICATION FILED JUNE 22, 1901.
NO MODEL. 4 SHEETS—SHEET 4.

Witnesses
Geo. H. Byrne
Clarence A. Bateman

Inventor
J. G. Rider.
By Wilkinson & Fisher
Attorneys

No. 739,720.

Patented September 22, 1903.

UNITED STATES PATENT OFFICE.

JAY G. RIDER, OF ROCKFORD, ILLINOIS.

FOUNTAIN-PEN.

SPECIFICATION forming part of Letters Patent No. 739,720, dated September 22, 1903.

Application filed June 22, 1901. Serial No. 65,658. (No model.)

*To all whom it may concern:*

Be it known that I, JAY G. RIDER, a citizen of the United States, residing at Rockford, in the county of Winnebago and State of Illinois, have invented certain new and useful Improvements in Fountain-Pens; and I do hereby declare the following to be a full, clear, and exact description of the invention, such as will enable others skilled in the art to which it appertains to make and use the same.

My invention relates to an improvement in fountain-pens; and the objects of my invention are to produce an inexpensive and efficient pen attractive in appearance and constructed so that it can be filled without unscrewing any part thereof, not liable to become gummed in, non-leakable, and one in which the flow of ink can be accurately regulated.

With these objects in view my invention consists in the construction and combination of parts, as hereinafter described and claimed.

Figure 8:
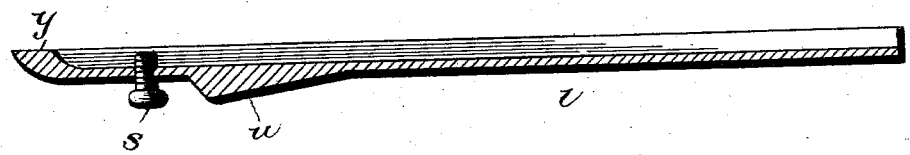
Figure 9:
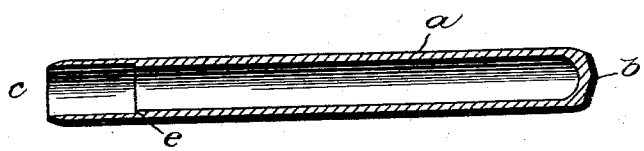
Figure 10:
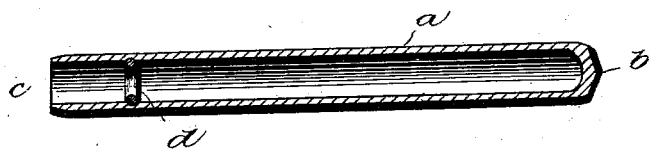
Figure 11:
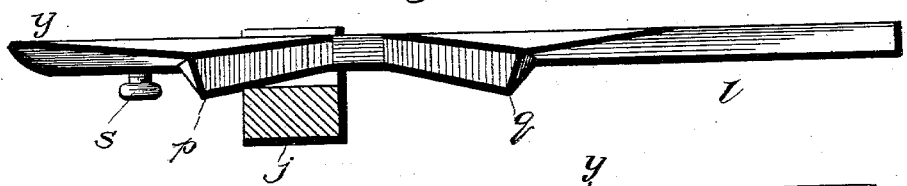
Figure 13:
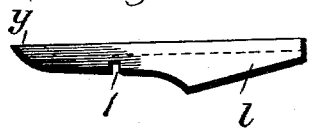
Figures 12, 14:
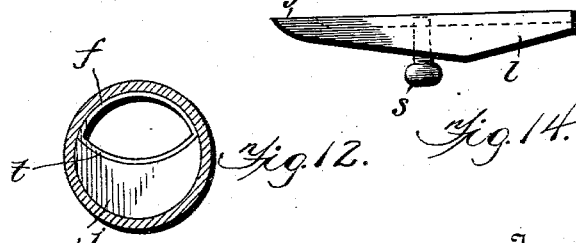
Figure 26:
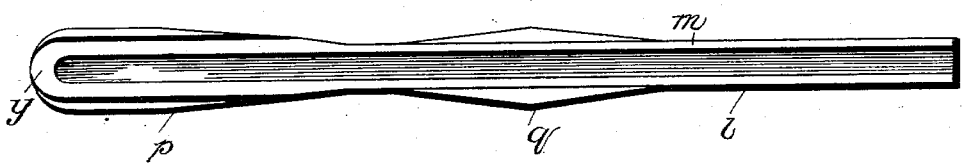
Figure 27:
Figure 28:
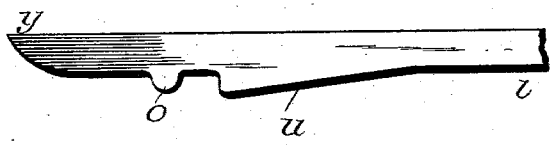
Figure 29:
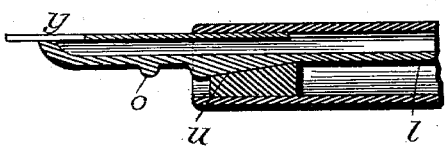
Figure 30:
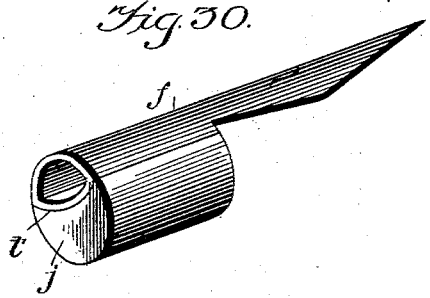

In the accompanying drawings, Figure 1 is a perspective view of a fountain-pen embodying my invention with the cap removed. Fig. 2 is a longitudinal section of the same. Fig. 3 is an enlarged perspective view of the feeder. Fig. 4 is a perspective view of my complete fountain-pen, the cap being shown in section. Fig. 5 is a perspective view of the pen-point with a plug therein. Fig. 6 is a perspective view of a different form of pen-point. Fig. 7 is an end view of Fig. 5, but showing a different form of aperture in the plug. Fig. 8 is a longitudinal section of a modified form of the feeder. Fig. 9 is a longitudinal section of the body or barrel of the fountain-pen. Fig. 10 is a longitudinal section of a modified form of the same. Fig. 11 is a perspective view of a modified form of the feeder, but showing the plug in cross-section; and Fig. 12 is a cross-section of the fountain-pen, showing a modified form of the pen-point and the plug. Fig. 13 is a side view of part of a modified form of feeder. Fig. 14 is a similar view of part of another form of feeder. Figs. 15, 16, and 17 are rear views of different forms of pen-points, and Fig. 18 is a top view of a modified form of pen-point. Fig. 19 is a longitudinal section of a modified form of barrel. Figs. 20, 21, 23, and 24 are rear end views showing modifications of the plug and pen-points. Fig. 22 is a perspective view of a modified form of pen-point with the plug therein, and Fig. 25 is a longitudinal section showing a modification of the feeder. Fig. 26 is a plan view of the feeder shown in Fig. 11. Fig. 27 shows a further modification of the feeder. Fig. 28 is an enlarged view of the portion of the feeder shown in Fig. 2. Fig. 29 is a longitudinal section showing a modified form of the plug. Fig. 30 is a perspective view of the modification shown in Fig. 12.

$a$ represents the barrel of the fountain-pen, having a closed end $b$ and an open end $c$. Near the open end a metal ring $d$ is fitted into a groove in the inside of the barrel. Instead of this ring a ridge $e$ may be formed in the barrel, the ring or ridge, as the case may be, serving as a stop to prevent the plug from being pushed too far into the barrel. Lugs on the pen-points may also be used for the same purpose.

In Fig. 19 another modification is shown having a groove 2 near the open end $c$. In this groove a spring carried by the pen-point is adapted to fit, thereby securing the pen-point and the plug in the barrel.

$f$ represents the pen-point, the preferred form of which is shown in Fig. 5 and which has a round body $g$, adapted after the plug has been inserted therein to be pushed into the open end $c$ of the barrel. The pen-point, besides being divided in the usual manner, is provided with a curved perforation, leaving a tongue $h$, which can readily be bent up or down by means of a knife to regulate the admission of air into the barrel of the pen, and thus regulate the flow of the ink.

The tongue $h$ may either be separated from the slit in the pen-point, as shown in Fig. 1, or it may reach up just to the end of the slit, as shown in Fig. 18. A lug $r$ is formed on the body $g$ to prevent the pen-point from being pushed in too far when the interior of barrel $a$ is smooth. Of course such a lug or lugs may be used on any of the pen-points shown.

A cheaper form of pen-point is shown in Fig. 6, in which the rear edges $i$ are bent inward, which hold the pen-point in position by frictional engagement with the plug and barrel.

In Fig. 12 still another form of pen-point is shown, the rear part being bent so as to form an approximately elliptical shape *t*.

*l* represents the feeder, which is provided with a longitudinal groove *m*, which extends nearly the whole length of the feeder on its upper side, gradually growing shallower toward the end *y*, where it contacts with the pen-point. This groove, while desirable, is not absolutely necessary, since the ink will flow between the pen-point and feeder even if the latter is not grooved, and of course it may terminate in a square shoulder near the end *y*. The feeder is provided with outwardly-tapering portions *n* and a downwardly-tapering portion *u*, whereby a tight joint is formed when the feeder is pushed into the aperture of the plug *j*.

It is of course obvious that one side of the feeder may be made straight and the other inclined, as shown in Fig. 27, or the taper may be made in the plug *j*, as shown in Fig. 29, or both feeder and plug may be tapered, as shown in the same figure.

The feeder is provided with a projection *o* on its under side, by means of which it may easily be pushed into or drawn out of the plug. In Fig. 13 a groove 1 is shown, which serves the same purpose as the projection *o*. In Figs. 8 and 14 instead of the projection *o* a small screw *s* is shown, which serves as a projection to be taken hold of to move the feeder in and out of the barrel and which also serves to regulate the flow of the ink by partially closing the air and ink space in the feeder. It will be readily seen that such regulation will be accomplished by moving the screw *s* in and out, as may be desired. Obviously a sliding plug held in place by friction could be used instead of a screw. Two different means for regulating the flow of ink are therefore shown—the screw *s* and the tongue *h*. Either of these is amply sufficient for this purpose; but I prefer to have both in every fountain-pen.

The plug *j* is circular in its general outline and is provided with an aperture or cut-away portion, (for the reception of the feeder,) which may be square, as shown at *z*, Fig. 5, or of the shape shown at *k*, Fig. 7, or as shown in Fig. 12, or of shapes to accommodate the pen-points shown in Figs. 15, 16, and 17. This plug is arranged to fit snugly in the part *g* of the pen-point if the one shown in Fig. 5 is used or else snugly into the barrel.

If the aperture is square, as shown in Fig. 5, the form of feeder shown in Fig. 3 is used. If the cut-away portion is as shown in Fig. 7 or in Fig. 12, the shape of the feeder must be varied slightly to insure a perfect fit.

In Figs. 20, 21, 23, and 24 a plug *j* of the same general shape as above described is shown, but the pen-points are fitted thereupon in different ways. In Fig. 20 the pen-point 3 is fitted into shoulders 4 and 5 in the plug *j*. In Fig. 21 the pen-point 6 is in contact with the upper edges 7 and 8 of the plug. In Fig. 23 the pen-point 9 is fitted in a curved slot 10 in the plug and is completely inclosed thereby, and in Fig. 24 the pen-point 11 (shown in Fig. 6 and provided with the wings *i*) fits over the upper part of the plug, with the wings *i* fitting in slots 12 and 13 in the plug *j*.

One advantage of the construction shown is that the flow of ink can be accurately and easily regulated in two different ways, and another and still more important advantage is that the fountain-pen can be easily and quickly filled, and this, too, without unscrewing any part thereof or soiling the fingers or clothes of the user.

For the purpose of filling the pen the feeder is adjustable longitudinally of and also at right angles to the face of the pen-point.

The projection *o* or the groove 1 or the screw *t* can be engaged by the thumb-nail and the feeder drawn wholly or partially out of the barrel, leaving plenty of space for the filling operation.

Every one who has used a fountain-pen for any considerable length of time knows what a disagreeable and oftentimes difficult task it is to fill it. The ink gets into the screw-threads and hardens, rendering it difficult to unscrew the end, and after the pen is filled as the end is screwed on some ink is sure to work out through the screw-joint, thus making the whole operation disagreeable and dirty. By my construction these objections are removed and the operation of filling is rendered easy, simple, and clean.

It is obvious that the pen-point may be fastened directly to the feeder, if desired, and that both together or the pen-point, feeder, and plug at once may be wholly or partially removed from the barrel to allow the latter to be filled with ink.

The cap *v* is shown in Fig. 4. The open end of the barrel is preferably tapered off, as shown at *x*, and over this tapered end the cap, the opening in which is cylindrical, is placed. To prevent breakage and leakage, a metal ring *w* is fitted in a groove near the open end of the cap. This construction makes a perfectly-tight joint and is much preferable to a construction in which the opening in the cap is outwardly flared, since this latter construction seriously weakens the cap, rendering it much more liable to break.

It is highly desirable to have fountain-pens so constructed that the ink will not leak from the barrel into the cap, even when inverted, since this liability to leak is one of the most serious objections to ordinary fountain-pens. In Figs. 11, 13, and 14 are shown means for absolutely preventing such leakage, even if the pen is kept inverted for days.

In Fig. 11 the feeder *l* is provided not only with an outer projection *p*, but also with a similarly-shaped, but oppositely-arranged, inner projection *q*. The feeder is put into the plug first and then both plug and feeder inserted into the barrel together. When it is desired to fill the pen, the feeder is drawn part way out, so that the narrow part between the projections $p$ and $q$ will come nearly to the outer edge of the plug, in which position plenty of space for the filling operation will be provided. When the person using the pen has finished with it, all he has to do to prevent leakage is to pull the feeder out till the inner projection $q$ comes into close contact with the plug $j$. This will absolutely prevent leakage, and it is not necessary to use a cap, though such is desirable for the purpose of protecting the pen-point. Moreover, the cap always has a small hole in it to allow passage for the air in and out of it as it is pulled off from or pushed over the end $c$. The ordinary construction allows the ink to leak out through this hole if the cap is not kept uppermost; but by my construction leakage is absolutely prevented.

In Figs. 13 and 14 I have shown two forms of feeder by means of which leakage may be avoided. These feeders are designed to be pulled directly out of the pen, turned end for end, and then pushed back again, the taper on the outer end $y$ being such that the feeder will engage the sides of the plug and be stopped before the groove has passed beyond the inner face of the plug. After one of these feeders has been removed, reversed, and pushed firmly back into the plug leakage will be absolutely prevented. These forms of feeder are shorter than those shown in Fig. 3, for example, so that after they have been reversed in position they will not prevent the cap from engaging properly with the barrel.

An important feature of my invention is that the feeder lies in close proximity for its entire length, except the projecting part, to the upper part of the barrel, as shown in Fig. 2. By this construction when the pen-point is raised the ink drains quickly back into the barrel, preventing the ink from remaining under the pen-point, from whence it would, if present, be liable to ooze out and soil the interior of the cap, which is a very serious objection.

My invention relates to that class of fountain-pens known as "jointless," and it not only does away with the troublesome leaking incident to ordinary joint pens, but it also does away with objections almost as serious in jointless pens—namely, the sticking of the plug by reason of the ink drying in the joint and the forcing of ink out upon the fingers or garments when the plug is inserted in a jointless pen. The plugs commonly in use in jointless pens replace so much air or ink space that when they are forced into place part of the ink is almost sure to be forced out, as is well known, and soil the fingers. In my construction the area of contact between the feeder and plug is so small that no difficulty is experienced by gumming, and the feeder is of such a shape and size that the air can easily escape while the feeder is being pushed in. My invention solves in the simplest manner possible the vexatious problem of regulating the flow of ink at the will of the user, saving the expense and trouble of sending the pen back to the manufacturer for regulation, a thing now frequently done.

An important feature of my invention is making the pen-point circular or curved in the arc of a circle where it fits the inner bore of the barrel. By this construction bending of the pen-point out of set when it is put in position is avoided and a tight joint is secured, whereby the air which works into the barrel as the ink flows out is compelled to pass in almost exclusively through the feeder, a very advantageous result.

The fact that in my invention the feeder is in contact with the upper part of the barrel throughout its entire length behind the heel of the pen-point gives me absolute control of the ink, no matter what the size of the barrel or whether it is completely or partially filled, a result which has heretofore not been attained in any pen with which I am familiar.

By the use of a metal ring in the cap, which takes the strain when the cap is in place, I render the cap non-breakable under any ordinary conditions of treatment, which is a great advantage over the ordinary pen. Finally by means of the tapering plug I have overcome one of the most serious objections to the ordinary fountain-pen, leaking, and have rendered it possible to easily and quickly fill such a pen without soiling the fingers or garments.

In Fig. 22 is shown a modified form of the pen shown in Fig. 5, which modified form is the one preferred for the larger and more expensive kind of fountain-pens. In this form the cylindrical part of the pen-point $g$ has slits cut in it, leaving a spring-flap 14, which flap is adapted to fit into an internal circumferential groove in the barrel, thus securing the pen in its proper position in the barrel. Of course the other pen-points shown could be provided with a similar spring, or a spring could be attached to a pen-point extending to the rear thereof.

In Fig. 25 is shown my preferred form of regulator as applied to the ink-feeder. The feeder $l$, provided with a groove $m$ in its upper side, has a projection 16, provided with an internal screw-thread, with which a screw 17 is engaged. This screw being wholly within the groove $m$ and being completely concealed under ordinary conditions of use is not liable to be disarranged by careless handling.

While I have thus described my invention and shown the forms in which I have embodied it, I wish it to be understood that I do not limit myself to the details described and shown.

What I claim, and desire to secure by Letters Patent of the United States, is—

1. In a fountain-pen, the combination of a barrel, a stationary pen-point secured in one end thereof, and a feeder lying next to said pen-point and movable independently of said pen-point, said feeder having the portion thereof which extends into the barrel reduced in size.

2. In a fountain-pen, the combination of a holder, a pen-point fixed in said holder and a longitudinally-movable feeder in said holder, provided with an enlarged portion, whereby the holder may be filled after the partial removal of said feeder from said holder.

3. In a fountain-pen, the combination with a holder having an opening in one end, and a pen supported in said opening, of a longitudinally-movable feeder supported in the holder independently of the pen and having a beveled face to control the relation of said feeder to the pen.

4. In a fountain-pen, the combination with a tubular holder having an opening in one end, and a pen fixedly supported in said opening, of a longitudinally-movable feeder supported in the holder independently of the pen and having a beveled portion.

5. In a fountain-pen, the combination with a tubular holder having an opening in one end, and a pen supported against the wall of said opening, of a longitudinally-movable feed-tube supported in the holder independently of the pen and having a beveled face to control the relation of said feed-tube to said pen.

6. In a fountain-pen, the combination with a tubular holder having an opening in one end and a pen supported against the wall of said opening, of a feeder supported independently of the pen and movable longitudinally of said pen and also toward and away from the face of the pen.

7. In a fountain-pen, the combination with a tubular holder having an opening in one end and a pen supported within said opening, of a feed-tube supported independently of the pen and movable longitudinally of and also at right angles to the face of the pen, for the purpose of permitting the holder to be filled.

8. A fountain-pen having an opening in one end to receive the pen-point and feeder, separate means in said opening providing a curved seat for said pen-point, and shoulders at the sides of said seat to receive the side edges of the pen-point so as to firmly seat the pen-point in said opening independently of the feeder.

9. In a fountain-pen, the combination of a barrel or holder, apertured means for closing one end thereof and a feeder, having an enlarged portion, movable back and forth in said means, whereby the barrel may be filled after the partial removal of the feeder and whereby the aperture in said means may be closed by the return of said feeder to its normal position.

10. A fountain-pen having an opening in one end to receive the pen-point and feeder combined with the pen-point, feeder, and a plug in said opening having shoulders constituting bearings for the side edges of the pen-point to firmly hold it against displacement independently of the feeder.

11. In a fountain-pen, the combination of the barrel having an opening in one end, an apertured plug having shoulders provided in said opening to firmly hold the pen-point in position in the said opening, and a feeder having a beveled enlargement thereon fitting the aperture in said plug.

12. A fountain-pen having an opening in one end to receive the pen-point and feeder, a plug adapted to fit in said opening having a curved seat for said pen-point, and shoulders at the sides of said seat to receive the side edges of the pen-point so as to firmly seat the pen-point in said opening independently of the feeder and a movable feeder in said plug.

13. A fountain-pen having an opening in one end to receive the pen-point and feeder, a plug in said opening having shoulders constituting bearings for the side edges of the pen-point to firmly hold it against displacement independently of the feeder and a movable feeder, having an enlargement, in said plug.

14. In a fountain-pen, the combination of the barrel having an opening in one end, an apertured plug in said opening provided with shoulders to firmly hold the pen-point in position in the said opening, and a feeder having an enlargement thereon snugly fitting the aperture in said plug, said enlargement having a beveled surface adapted to enter the aperture of said plug.

15. In a fountain-pen, the combination of a barrel having an opening at one end, a stationary plug and a pen-point fitted into said opening, and a feeder passing through an aperture in said plug and normally filling said aperture but adapted to be displaced relatively to said pen-point and plug during the filling of the barrel.

16. In a fountain-pen, the combination of a barrel, an apertured plug, and a pen-point fitted in one end of said barrel, and a feeder movable longitudinally and at right angles relatively to said pen-point.

17. In a fountain-pen, the combination of a barrel, a stationary pen-point and apertured plug fixed in one end of said barrel, and a movable feeder adapted to close the aperture in said plug, said feeder being adapted to be displaced relatively to said pen and plug, during the filling of the barrel.

18. In a fountain-pen, the combination of a barrel, a stationary pen-point and apertured plug fitted tightly into one end of said barrel, and a feeder movable longitudinally within said plug, and provided with a beveled enlargement adapted to open and close the aperture in said plug.

19. In a fountain-pen, the combination of the barrel, a stationary pen-point and apertured plug fitted tightly into one end thereof, and a feeder movable longitudinally through the opening in said plug, provided with a beveled enlargement adapted to enter the opening in said plug to open and close the same.

20. In a fountain-pen, the combination of a barrel, a stationary pen-point and apertured plug fixed in one end thereof, a channeled feeder provided with an enlargement passing through said apertured plug, and a regulating-screw in said feeder.

21. In a fountain-pen, the combination of a barrel provided with a transverse groove, and a pen-point having a cylindrical rear portion with a spring punched out from said rear portion for engaging said groove.

22. In a fountain-pen, a feeder provided with a pair of projections having oppositely-inclined faces, said faces being oppositely arranged with respect to each other.

23. In a fountain-pen, a feeder having a projecting portion, whereby it may be moved back and forth in the pen, and a pair of projections having inclined faces oppositely arranged relative to each other.

24. In a fountain-pen, the combination of a barrel, a pen-point secured in one end thereof, an apertured plug also secured in one end of the said barrel, a feeder, and enlargements or projections having inclined faces carried by said feeder adapted to close said aperture.

25. In a fountain-pen, the combination of a barrel provided with a transverse groove, and a pen-point provided with a spring at its rear for engaging said groove.

In testimony whereof I affix my signature in presence of two witnesses.

JAY G. RIDER.

Witnesses:
FRANK D. BLACKISTONE,
JOHN H. HOLT.